UNITED STATES PATENT OFFICE.

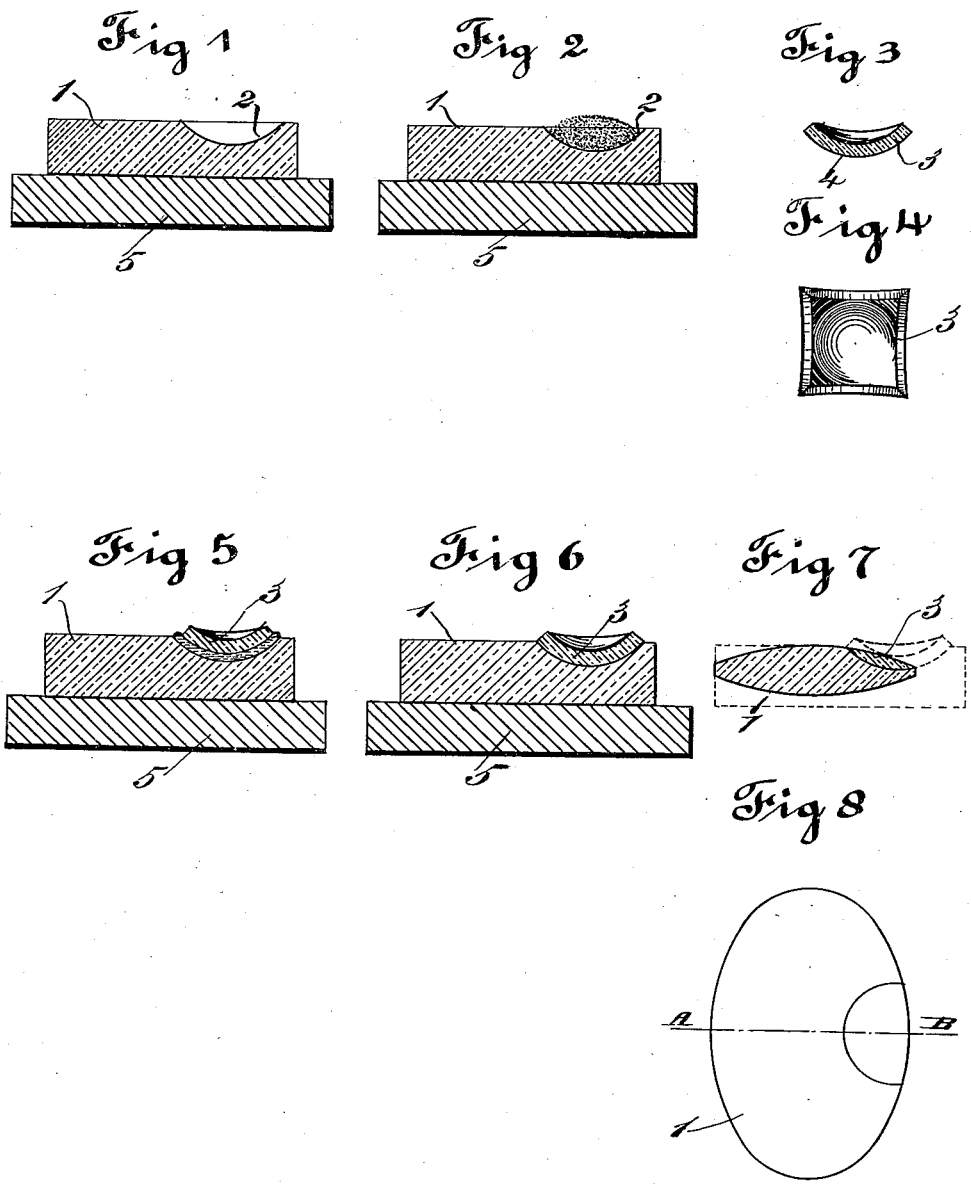

JOHN WIMMER, OF INDIANAPOLIS, INDIANA; THE INDIANA TRUST COMPANY EXECUTOR OF SAID WIMMER, DECEASED.

PROCESS OF MANUFACTURING BIFOCAL LENSES.

No. 848,335.  Specification of Letters Patent.  Patented March 26, 1907.

Application filed November 19, 1906. Serial No. 344,053.

*To all whom it may concern:*

Be it known that I, JOHN WIMMER, a citizen of the United States, residing at Indianapolis, in the county of Marion and State of Indiana, have invented certain new and useful Improvements in the Process of Manufacturing Bifocal Lenses, of which the following is a specification, reference being had therein to the accompanying drawings.

This invention relates to the art of manufacturing bifocal or multifocal integral lenses—*i. e.*, integral lenses having a plurality of focal distances and composed of a larger lens having a lower index of refraction and one or more smaller lenses having a higher index of refraction united together. Throughout this specification the words "major lens" will be used to designate the larger part of the integral lens having the lower index of refraction and the words "minor lens" to designate the smaller part or parts of the integral lens having the higher index of refraction.

The object of this invention is to manufacture bifocal or multifocal lenses by uniting separate pieces of glass having different indices of refraction into a single piece having the desired focal distances by means of a suitable flux or fusible cement which liquefies at a temperature below that of the fusing temperature of any of the pieces of glass of which the integral lens is composed. I attain this object by means of the process hereinafter described in the specification and illustrated in the accompanying drawings, in which similar numerals of reference designate like parts throughout the several views.

Figure 1 is a transverse sectional view of a major lens in which a depression for receiving a minor lens is formed. Fig. 2 is a similar view showing my fusible powder placed in the depression thereof. Fig. 3 is a transverse sectional view of a minor lens prepared to be applied to the depression of a major lens. Fig. 4 is a top view of the same. Fig. 5 is a transverse sectional view of a major-lens blank, showing the fused flux in the depression thereof with a minor lens placed thereon. Fig. 6 is a similar view showing the minor lens held in position in the depression of the major lens by the fusible cement. Fig. 7 is a transverse sectional view of an integral lens made by this method after the same is ground to the required curvature, taken on the line A B of Fig. 8; and Fig. 8 is a front view of the same.

In order that others skilled in the art be enabled to practice my invention of a process of manufacturing bifocal and multifocal lenses, I shall now proceed to describe the different steps of the same in detail, as follows: I first procure a piece of glass of a given index of refraction and of suitable dimensions from which to construct a major lens. I next grind or otherwise form in such major lens a concave depression 2 of such a curvature as will fit the convex side of a minor lens of the required focal distance. Said depression is formed far enough to one side of the center of said major lens to leave the field or surface of the desired size.

I select for a minor lens a piece of glass of a certain index of refraction differing from that of the major lens and that will make a minor lens 3 of the required focal distance and grind or otherwise form and polish a convex surface 4 on one of the sides of the same to correspond with and snugly fit the curvature of the depression 2, wherein it is to be placed. I next place the major and minor lenses 1 and 3 into a cleaning bath, which may be made, say, of pearlash and water, in the proportion, say, of one teaspoonful of pearlash to one pint of water, and heat this bath to the boiling-point and maintain it at that temperature for a time sufficient not only to remove all grit and spots from the ground and polished surfaces of the lenses, but also for the purpose of annealing or tempering them. The lenses are next removed from said bath and thoroughly and carefully dried, taking care that all foreign matter is removed and nothing adheres to their surfaces. I next procure a supporting-block 5, which is composed of a heat-resisting material which also possesses the quality of retaining heat, and heat the same hot enough to thoroughly dry the lenses when placed thereon, care being taken not to heat said block so hot as to cause cold lenses when placed thereon to crack. I next remove the heated block 5 out of the furnace and place it upon a suitable bench conveniently situated relatively to the furnace. I next take the major-lens blank and carefully wipe the polished surface of the depression thereof and remove all traces of dust from said surface by a suitable blower or hand-bellows provided for that purpose, after which I place said lens-blank upon said heated block with the depression up. I next take the minor lens 3 and carefully wipe the convex surface thereof and remove the dust from said surface by means of the said blower or hand-bellows and place said minor lens over the depression 2 of the major lens, with its convex side 4 up, in which position it soon becomes heated to the temperature of the major lens 1. The polished surfaces of the lenses when heated "sweat," and moisture forms on their surfaces. The moisture is then wiped off of the surfaces of the lenses. The said blower is then applied to the convex surface of the minor and the concave surface of the major lenses to remove all dust or moisture that may have collected or have been deposited on said surfaces. After the removal of all the moisture I next place a quantity of powdered glass flux, hereinafter described, into the depression 2, as shown in Fig. 2, and place said lens 1 and its supporting-block 5 in a furnace so arranged that the lens is shielded from the direct action of the heat during the time of heating. At about this time I place the minor lens 3 into another furnace and heat the same to about a temperature equal to that of the fusing-point of said glass flux.

When the glass flux in the depression 2 of the major lens has boiled until it is clear, the minor lens 3, when properly heated, is removed from its furnace and placed with its convex side 4 into the depression 2 upon the boiling flux. I then procure a suitable iron rod, which is heated at one of its ends to about the same temperature as the minor lens, and apply it to said minor lens 3, and the latter is pressed down into said depression and worked around therein until the greater portion of the now fluid glass flux and all the air-bubbles have been pressed out from between the surfaces of the concave depression of the major lens and convex surface 4 of the minor lens 3. For the purpose of annealing the lens thus made it is now taken out of the furnace and placed in an annealing-oven, which should be of a temperature about equal to that of the lenses at the time they are taken out of the furnace. Said oven, with the lenses therein, is caused to cool slowly until cooled to about the temperature of the outside atmosphere.

To complete the lens ready to be mounted, all that remains to be done is to grind the outside surfaces thereof to the required curvature and finally "edge the lens" preparatory to fitting it to a frame.

A flux that may be used in this process of manufacturing bifocal or multifocal lenses may be made of flint-glass, powdered, sixteen parts; pearlash, six parts; common salt, two parts, and powdered borax, one part. These ingredients are mixed thoroughly together and placed in a crucible and reduced to the fluid state. The mixture thus fused is poured into a vessel containing water, the water drained off, and the residue placed into a mortar and reduced to a fine powder. The flux or powder must be kept in a closed vessel to exclude the dust until required for use.

An integral lens made by this method may be taken apart at any time without injury to the curves of the component parts thereof by subjecting the lens to sufficient heat to melt the flux which holds the parts together. This is very convenient where the minor lens is found to have been made so as to produce the wrong focal distance.

Bifocal lenses have heretofore been made by the use of a cement, such as Canada balsam; but it was found that lenses made in that way were unsatisfactory, because the component parts of the lens would come apart when the same was exposed to such heat and to jars as are incident to the ordinary use of eyeglasses.

The component parts of integral bifocal lenses manufactured by this method will not separate under any conditions of the ordinary use of spectacles or when exposed to any of the common accidents incident to the use of eyeglasses.

I claim—

1. The process of manufacturing bifocal or multifocal integral lenses by forming in a larger piece of glass of a selected index of refraction a concave depression, and forming a convex surface on a smaller piece of glass having a different index of refraction, the radii of the curvature of the concave depression of the one and of the convex surface of the other being the same and uniting them by then placing in said concave depression a quantity of powdered-glass flux which fuses at a temperature below that required to make either of said pieces of glass flexible and subjecting the piece of glass with the powdered flux in its depression to sufficient heat to liquefy said flux and heating the other piece of glass to about the fusing temperature of said flux, and placing it with its convex surface down into the boiling flux in said concave depression and uniting the two pieces of glass by pressing the latter piece of glass into said depression and working it around and about therein, so as to force out all of the air-bubbles and most of said flux from between the surfaces of said pieces of glass and then solidifying said flux by slowly cooling said blank lens.

2. The process of manufacturing bifocal or multifocal integral lenses by forming a piece of glass of a required index of refraction to a convex surface on one side of such a radius as to make a lens of the required focal distance and forming in a larger piece of glass of a lower index of refraction than the first mentioned, a concavity of such a radius as to fit the convex surface of the said first-mentioned piece of glass and uniting them by placing a powdered-glass flux, such as described, in such depression and heating said piece of glass, with the glass flux in its depression, sufficiently hot to melt said flux and then placing the convex surface of the first piece of glass on said melted flux and by pressing and working it around and about in said depression and thereby forcing the air and the greater portion of said flux from between the surfaces of said pieces of glass, and leaving only a very thin film of said flux between the surfaces of said pieces of glass and then solidifying said flux by slowly cooling said blank lens, and then grinding the surfaces of said lens to the desired form.

3. The process of manufacturing bifocal or multifocal integral lenses by forming a piece of glass of a required index of refraction to a convex surface on one side of such a radius as to make a lens of the required focal distance and forming in a larger piece of glass of a lower index of refraction than the first mentioned, a concavity of such a radius as to fit the convex surface of the said first-mentioned piece of glass and uniting them by placing a powdered-glass flux, such as described, in such depression and heating said piece of glass, with the glass flux in its depression, sufficiently hot to melt said flux and then placing the convex surface of the first piece of glass on said melted flux and by pressing and working it around and about in said depression and thereby forcing the air and the greater portion of said flux from between the surfaces of said piece of glass, and leaving only a very thin film of said flux between the surfaces of said pieces of glass, and then slowly cooling the blank integral lens thus united by placing it in an oven heated to about the temperature of the fused glass flux and so constructed as to cool slowly and so arranged that its temperature is at all times under the control of the operator, and then permitting said oven and its contents to slowly cool, thereby solidifying the said glass flux.

In testimony whereof I affix my signature in presence of two witnesses.

JOHN WIMMER.

Witnesses:
  THOMPSON R. BELL,
  MISS E. THOMPSON.